(12) United States Patent
Dudish et al.

(10) Patent No.: US 9,273,155 B2
(45) Date of Patent: *Mar. 1, 2016

(54) SYSTEM AND METHOD FOR RAPID TRANSITIONING OF POLYOLEFIN PROCESSES FROM ONE PRODUCT TO ANOTHER

(71) Applicant: Ineos USA, LLC, League City, TX (US)

(72) Inventors: Gregory Dudish, Menlo Park, CA (US); Ernest Chan, Alvin, TX (US)

(73) Assignee: Ineos USA, LLC, League City, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/614,102

(22) Filed: Feb. 4, 2015

(65) Prior Publication Data

US 2015/0148506 A1    May 28, 2015

Related U.S. Application Data

(62) Division of application No. 13/930,072, filed on Jun. 28, 2013, now Pat. No. 8,986,618.

(51) Int. Cl.
*C08F 2/00* (2006.01)
*C08F 4/00* (2006.01)
(Continued)

(52) U.S. Cl.
CPC .............. *C08F 2/01* (2013.01); *B01J 19/0006* (2013.01); *B01J 19/0033* (2013.01); *B01J 19/24* (2013.01);
(Continued)

(58) Field of Classification Search
CPC ............ C08F 110/06; C08F 2/34; C08F 2/01; B01J 19/0033; B01J 19/0006; B01J 19/24; B01J 2219/00069; B01J 2219/00164; B01J 2219/00186; B01J 2219/00218; B01J 2219/00231; B01J 2219/24; B01J 2219/002
USPC .......... 526/194, 217, 348.1, 72, 348.5, 348.7, 526/351, 352
See application file for complete search history.

(56) References Cited

U.S. PATENT DOCUMENTS

| 8,986,618 B2 | 3/2015 | Dudish et al. |
| 2003/0105247 A1* | 6/2003 | Braganca ................ C08F 10/02 526/61 |

(Continued)

FOREIGN PATENT DOCUMENTS

| EP | 0124333 B1 | 11/1984 |
| WO | WO-0162700 A2 | 8/2001 |

OTHER PUBLICATIONS

PCT Sep. 23, 2014 International Search Report and Written Opinion mailed in International Application No. PCT/US14/43572.

(Continued)

*Primary Examiner* — William Cheung
(74) *Attorney, Agent, or Firm* — Gardere Wynne Sewell LLP; Chris P. Perque; Teresa J. Lechner-Fish (57) ABSTRACT

A gas-phase polyolefin reactor system for rapidly transitioning from one polyolefin product to another is disclosed. The reactor system comprises a control valve, a high-flow valve, a polyolefin reactor, a flow meter, a totalizer and an empirical model. During a transition, the empirical model predicts a required amount based upon an initial concentration and a selected ending concentration, the flow meter measures a flow rate, the totalizer determines a totalized amount when the flow rate of the first stream reaches the required amount based upon the measured flow rate and outputs the totalized amount to the empirical model, and the empirical model compares the required amount to the totalized amount and determines a transition endpoint. A method of rapidly transitioning the reactor system from one polyolefin product to another is also disclosed.

18 Claims, 4 Drawing Sheets

(51) Int. Cl.
  *C08F 10/00* (2006.01)
  *C08F 10/14* (2006.01)
  *C08F 110/10* (2006.01)
  *C08F 110/02* (2006.01)
  *C08F 2/01* (2006.01)
  *C08F 110/06* (2006.01)
  *C08F 2/34* (2006.01)
  *B01J 19/00* (2006.01)
  *B01J 19/24* (2006.01)

(52) U.S. Cl.
  CPC ................ *C08F 2/34* (2013.01); *C08F 110/06* (2013.01); *B01J 2219/002* (2013.01); *B01J 2219/00069* (2013.01); *B01J 2219/00164* (2013.01); *B01J 2219/00186* (2013.01); *B01J 2219/00218* (2013.01); *B01J 2219/00231* (2013.01); *B01J 2219/24* (2013.01)

(56) References Cited

U.S. PATENT DOCUMENTS

| | | |
|---|---|---|
| 2008/0243310 A1 | 10/2008 | Esposito et al. |
| 2008/0319583 A1 | 12/2008 | Hagerty et al. |
| 2010/0029870 A1 | 2/2010 | Chang |
| 2010/0249355 A1 | 9/2010 | Davis et al. |
| 2015/0147234 A1* | 5/2015 | Dudish ................ C08F 110/06 422/111 |

OTHER PUBLICATIONS

Dec. 17, 2014 Office Action mailed in U.S. Appl. No. 13/930,072, filed Jun. 28, 2013.
Dec. 18, 2014 Amendment and Response to Office Action Mailed on Dec. 17, 2014 in U.S. Appl. No. 13/930,072, filed Jun. 28, 2013.
Jan. 2, 2015 Notice of Allowance / Allowability Mailied in U.S. Appl. No. 13/930,072, filed Jun. 28, 2013.
Oct. 16, 2015 Office Action mailed in U.S. Appl. No. 14/614,631, filed Feb. 5, 2015.

* cited by examiner

SYSTEM AND METHOD FOR RAPID TRANSITIONING OF POLYOLEFIN PROCESSES FROM ONE PRODUCT TO ANOTHER

CROSS-REFERENCE TO RELATED APPLICATION

This application is a divisional application of U.S. patent application Ser. No. 13/930,072 filed Jun. 28, 2013, now U.S. Pat. No. 8,986,618.

TECHNICAL FIELD

This invention relates to a system and method for rapidly transitioning from one polyolefin product to another within a gas-phase polyolefin reactor to reduce the off-grade material produced during the transition.

BACKGROUND OF THE INVENTION

Control and ability to rapidly transition from one polyolefin product to another is essential when producing a portfolio of products on a gas-phase polyolefin reactor. During the transition, the flow rate of one or more reactant components (e.g., hydrogen, monomer, co-monomer, co-catalyst and/or catalyst modifier) must be changed. For example, to control and decrease the molecular weight of a polyolefin product, the ratio of hydrogen to monomer must be increased. In other words, the hydrogen concentration within the polyolefin reactor determines the molecular weight of the polyolefin product. Molecular weight is a key, measurable property, which determines physical properties in the polyolefin product. By increasing the hydrogen concentration within the polyolefin reactor, the molecular weight of the produced polyolefin is decreased. Hydrogen serves to terminate the polymerization reaction on the catalyst, and to halt the formation of the polyolefin chain. An increased hydrogen concentration (i.e., decreased monomer concentration) results in shorter polyolefin chains, and in a lower molecular weight polyolefin product.

Conversely, to control and increase the molecular weight of the polyolefin product, the ratio of hydrogen to monomer must be decreased. By increasing the monomer concentration within the polyolefin reactor, the molecular weight of the produced polyolefin is increased. An increased monomer concentration (i.e., decreased hydrogen concentration) results in longer polyolefin chains, and in a higher molecular weight polyolefin product.

To change other physical properties of the polyolefin product, the co-monomer, co-catalyst and/or catalyst modifier concentration must be changed. For example, in impact co-polymer (ICP) polypropylene production, the ethylene concentration within the polyolefin reactor must be changed to achieve the specific properties for various ICP grades. A change in ethylene concentration results in an altered rubber content in the produced polyolefin product.

In other words, each polyolefin product has specific physical properties that define that grade. If a produced polyolefin does not have these physical properties, it is an off-grade material with an inherently low value. During the transition, the produced polyolefin does not have the physical properties of either the starting grade or the ending grade. The polyolefin produced during the transition is a low-value, off-grade material.

Thus, a system and method is needed to minimize the transition period and to reduce the production of off-grade material during transitions.

SUMMARY OF THE INVENTION

The present invention takes advantage of the ability to diffuse a reactant component in a gas-phase polyolefin reactor to rapidly affect the physical properties of the polyolefin powder produced by increasing concentrations of reactant components.

In an embodiment, the present invention can rapidly increase the hydrogen concentration within a gas-phase polyolefin reactor to reduce the molecular weight of the polyolefin. The molecular weight is a key, measurable property which determines physical properties in the polyolefin product. A rapid change in hydrogen concentration allows for a faster reduction in molecular weight, and, therefore, a much shorter transition period from a higher molecular weight product to a lower molecular weight product. The accelerated transition decreases the amount of off-grade production and, therefore, reduces operation costs.

Conversely, in an embodiment, the present invention may be applied to rapidly increase the monomer concentration within the gas-phase polyolefin reactor to increase the molecular weight of the polyolefin. A rapid change in monomer concentration allows for a faster increase in molecular weight, and, therefore, a shorter transition period from a lower molecular weight product to a higher molecular weight product.

Further, in an embodiment, the present invention can be applied to rapidly increase the co-monomer within the gas-phase polyolefin reactor to change other physical properties in the polyolefin product. For example, in ICP polypropylene production, the co-monomer (e.g., ethylene) could be rapidly changed to alter rubber content in the produced polyolefin product, and, thereby, achieve the specific properties for various ICP grades. In polypropylene production, the ethylene, 1-butene, 1-hexene and/or 1-octene concentration may be changed to achieve the specific properties for various grades.

In an embodiment, the present invention could be applied to rapidly switch a co-catalyst or catalyst modifier to transition from one polyolefin product to another. For example, a replacement of di-isopropyldimethoxysilane (DIPDMS) with di-isobutyldimethoxysilane (DIBDMS) within the polyolefin reactor would increase the production of atactic polymer and, thereby, decrease the flexural modulus of the produced polyolefin product.

These and other objects, features, and advantages will become apparent as reference is made to the following detailed description, preferred embodiments, and examples, given for the purpose of disclosure, and taken in conjunction with the accompanying drawings and appended claims.

BRIEF DESCRIPTION OF THE DRAWINGS

For a further understanding of the nature and objects of the present invention, reference should be made to the following detailed disclosure, taken in conjunction with the accompanying drawings, in which like parts are given like reference numerals, and wherein.

DETAILED DESCRIPTION OF PREFERRED EMBODIMENTS OF THE INVENTION

The following detailed description of various embodiments of the present invention references the accompanying drawings, which illustrate specific embodiments in which the invention can be practiced. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. Therefore, the scope of the present invention is defined only by the appended claims, along with the full scope of equivalents to which such claims are entitled.

Gas-Phase Polyolefin Reactor System

Figure 1A:
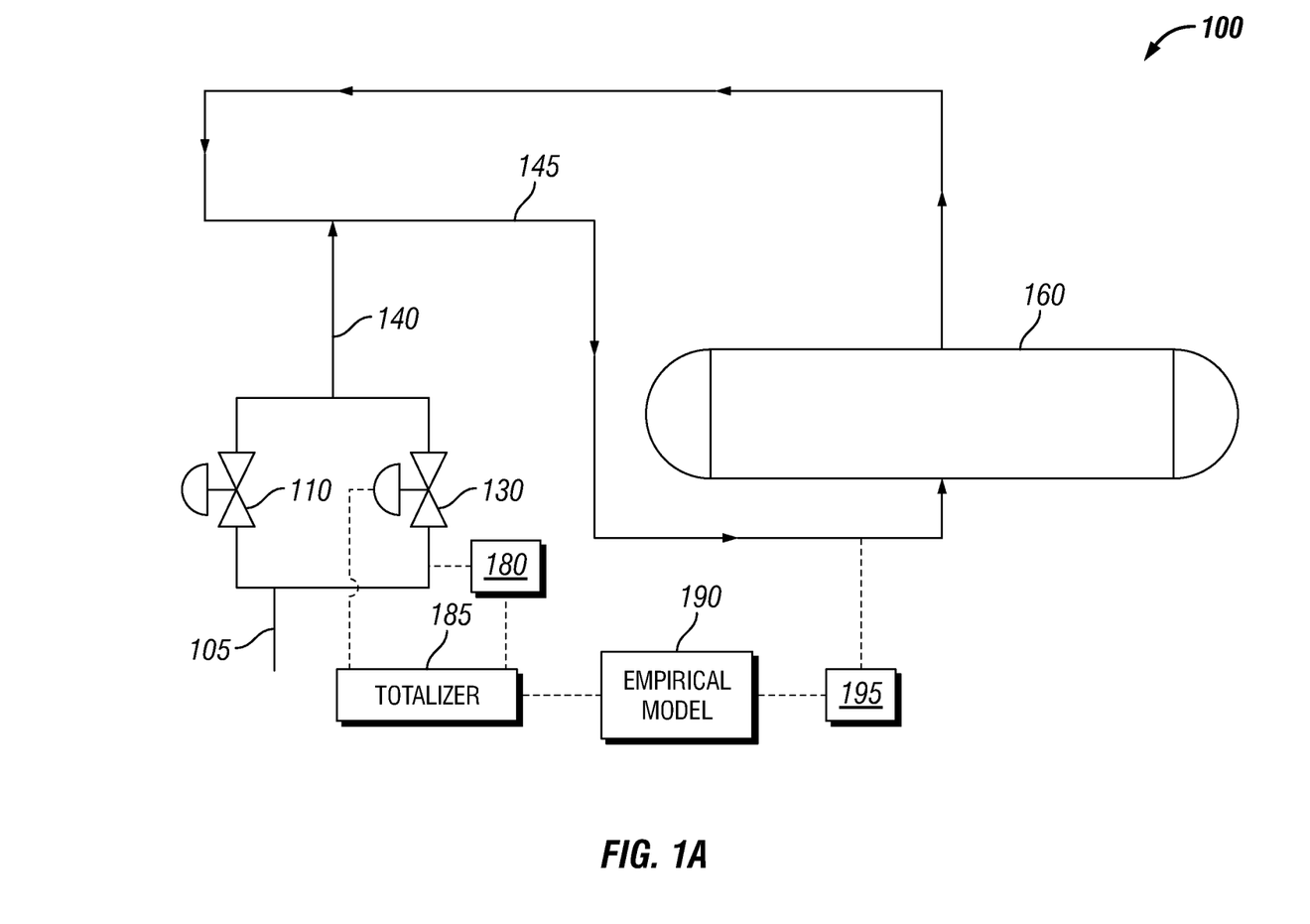
FIG. 1A illustrates a process flow diagram according to an embodiment of the invention.

A process flow diagram according to an embodiment of the present invention is illustrated in FIG. 1A. In particular, FIG. 1A shows a process flow diagram for a gas-phase polyolefin process 100. Examples of suitable polyolefin processes include, but are not limited to, polyethylene, polypropylene and polybutene. Suitable polyethylene processes are available from Ineos Technologies (e.g., INNOVENE™ G Process) or Univation Technologies (e.g., UNIPOL™ PE Process); and suitable polypropylene processes are available from Dow Chemical (e.g., UNIPOL™ PP Process) or Ineos Technologies (e.g., INNOVENE™ PP Process).

An input stream 105 comprises a reactant component (e.g., hydrogen) coming from a header (not shown). A header is a pipe which contains the main supply of a reactant component or a mixture of reactant components. In an embodiment, the reactant component (e.g., hydrogen) may be supplied from the header to a gas-phase polyolefin reactor 160 through a control valve 110 or through a high-flow valve 130.

The input stream 105 comprising the reactant component (e.g., hydrogen) is directed through a steady-state control valve 110 or through a high-flow valve 130. The steady-state valve 110 supplies a continuous stream (i.e., constant flow) of reactant component to the gas-phase polyolefin reactor 160 during normal operations to maintain specific product properties. Suitable examples of steady-state, bypass valves and high-flow valves include, but are not limited to, sliding stem valves and other types of valves. A flow range of the valve relative to normal operating conditions is more important than any specific type of valve. A suitable valve is available from Emerson Process Management (e.g., FISHER™ Sliding Stem Control Valve). The high-flow valve 130 has a flow meter 180, which outputs a measured flow rate to a totalizer 185. In an embodiment, the flow meter 180 is an orifice plate which provides the flow rate through an upstream high-flow valve 130 via calculations. Examples of suitable flow meters include, but are not limited to, orifice plates and other types of flow measurement devices. A suitable flow meter is available from Emerson Process Management (e.g., ROSEMOUNT™ Conditioning Orifice Flowmeter). The totalizer is an algorithm to calculate the amount of reaction component added to the polyolefin reactor 160 based on the input measured flow rate from the flow meter 180. Examples of suitable totalizers include, but are not limited to, Distributed Control System (DCS) algorithms and other types of totalizing algorithms. A suitable totalizer is available from Honeywell (e.g., DCS algorithm).

During normal operation, the input stream 105 is directed through a steady-state control valve 110. When the steady-state control valve 110 is used, the input stream 105 comprising the reactant component (e.g., hydrogen) enters via stream 140 into stream 145.

During a transition, a limiting factor is the flow rate of the reactant component within a gas-phase polyolefin reactor 160. Examples of suitable gas-phase polyolefin reactors include, but are not limited to, gas-phase horizontal polyolefin reactors and any other type of gas-phase polyolefin reactor. A suitable gas-phase polyolefin reactor is available from Nooter Corporation (e.g., 8-foot 0-inch I.D. Homopolymer Reactor).

Generally, a flow rate of at least 200% over a maximum steady-state operation is desired to transition from one polyolefin product to another within the polyolefin reactor 160. Alternatively, the desired transition flow rate may be about 100 lbs/hour over the maximum steady-state operation (e.g., 30 lbs/hour). At lower flow rates, the transition may occur too slowly and result in prolonged off-grade production. In an embodiment, the transition flow rate may be from about 200% to about 5000% over the maximum steady-state operation. Alternatively, the transition flow rate may be about 100 lbs/hour to about 2500 lbs/hour.

At some point with higher flow rates, the header pressure of input stream 105 supplying the reactant component will drop, and the stream 140 will no longer have sufficient pressure to enter the recycle gas system (i.e., stream 145). Further, the reactant component can be added so rapidly that accuracy of a totalizer 185 is diminished. It is also possible that the addition of a very large amount of any given reactant component could cause a reactor 160 upset.

During a transition, input stream 105 comprising the reactant component (i.e., hydrogen) is directed through the high-flow valve 130 to stream 140, which enters stream 145. Stream 145 carries the reactant component (e.g., hydrogen) into the gas-phase polyolefin reactor 160.

The empirical model 190 receives input from an online analyzer 195 (e.g., off-gas analyzer), which measures the concentration of the reactant component (e.g., hydrogen). Examples of suitable online analyzers include, but are not limited to, gas chromatographs and mass spectrometers. A suitable online analyzer is available from Yokogawa (e.g., GC1000 MARK II™).

At the beginning of any transition, the empirical model 190 receives input from the online analyzer 195, which measures a starting concentration of the reactant component (e.g., hydrogen). The empirical model 190 predicts a required amount (lbs) of reactant component (e.g., hydrogen) necessary to complete the transition based upon the measured starting concentration of the reactant component (e.g., hydrogen) and a desired ending concentration of the reactant component (e.g., hydrogen).

The totalizer 185 receives input from the flow meter 180, which measures a flow rate of the reactant component (e.g., hydrogen). Based upon the measured flow rate of the reactant component (i.e., input stream 105), the totalizer 185 determines when the reactant component (e.g., hydrogen) flow rate into the polyolefin reactor 160 reaches the required amount (lbs) of reactant component. The empirical model 190 compares the required amount (lbs) of reactant component (e.g., hydrogen) to totalized amount (lbs) of reactant component to determine a transition endpoint, and outputs the transition endpoint to the totalizer 185. By predicting the endpoint of the transition, the totalizer 185 is able to simultaneously shut-off the flow of reactant component (e.g., hydrogen) at the transition endpoint via the high-flow valve 130. Once the high-flow valve 130 adds the required amount (lbs) of reactant component (e.g., hydrogen), the high-flow valve 130 is closed and the transition is complete.

Prototype Gas-Phase Reactor System for Testing Present Invention

Figure 1B:
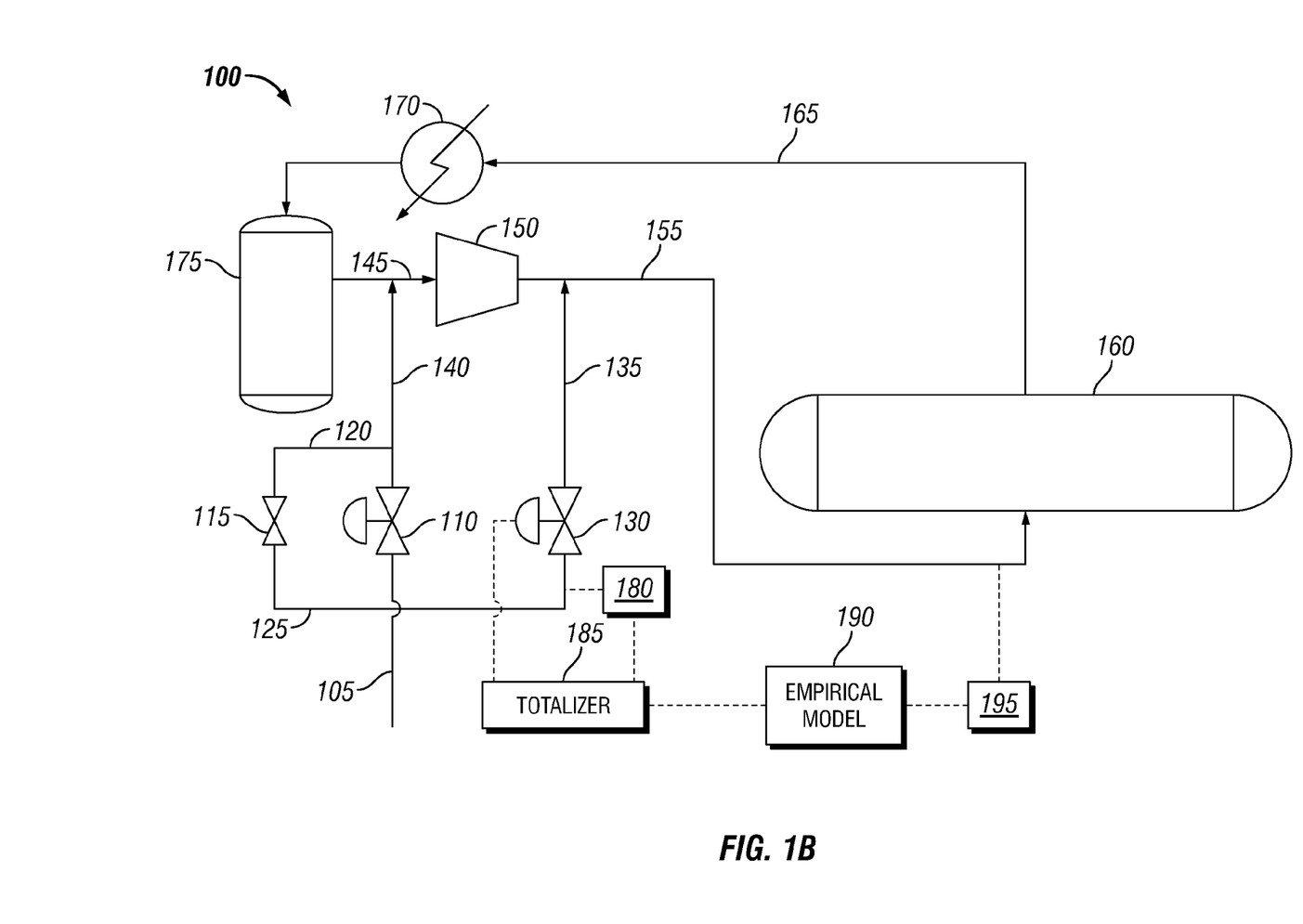
FIG. 1B illustrates a process flow diagram according to a prototype of the present invention, which was used to evaluate the invention.

A process flow diagram according to a prototype of the present invention is illustrated in FIG. 1B. In particular, FIG. 1B shows a process flow diagram for a gas-phase polyolefin process 100. In this example, an Ineos Technologies polypropylene process (i.e., INNOVENE™ PP Process) was used to evaluate the present invention.

An input stream 105 comprises a reactant component (e.g., hydrogen) coming from a header (not shown). The reactant component (e.g., hydrogen) was supplied from the header to a gas-phase polyolefin reactor 160 through a control valve 110 or through a bypass valve 115 and a high-flow valve 130.

The input stream 105 comprising the reactant component (e.g., hydrogen) was directed through a steady-state control valve 110 or through a bypass valve 115 and a high-flow valve 130. The steady-state valve 110 supplied a continuous stream (i.e., constant flow) of reactant component to the gas-phase polyolefin reactor 160 during normal operations to maintain specific product properties. In this example, an Emerson Process Management valve (e.g., FISHER™ Sliding Stem Control Valve) was used for the evaluation. The high-flow valve 130 has a flow meter 180, which outputs a measured flow rate to a totalizer 185. In this example, an Emerson Process Management flow meter (e.g., ROSEMOUNT™ Conditioning Orifice Flowmeter) and a Honeywell totalizer (e.g., DCS algorithm) were used for the evaluation.

During normal operation, the input stream 105 was directed through a steady-state control valve 110. When the steady-state control valve 110 is used, the input stream 105 comprising the reactant component (e.g., hydrogen) entered via stream 140 into stream 145 on a low-pressure side (i.e., suction side) of a compressor 150.

During transitions, the limiting factor was the flow rate of the reactant component within a gas-phase polyolefin reactor 160. Generally, a flow rate of at least 200% over a maximum steady-state operation was desired to transition from one polyolefin product to another within the polyolefin reactor 160. Alternatively, the desired transition flow rate was at least 100 lbs/hour over the maximum steady-state operation (i.e., 30 lbs/hour). At lower flow rates, the transition occurred too slowly and resulted in prolonged off-grade production.

During the evaluation, inventors discovered that an achievable upper limit on the flow rate of the reactant component was about 2000% to about 5000% over the maximum steady-state operation. Alternatively, the transition flow rate was about 1,000 lbs/hour to about 2500 lbs/hour. Generally, this value depends on the maximum steady-state flow rate during operation, and, therefore, a lower maximum steady-state operation may result in a transition flow rate up to about 5000% over the maximum steady-state operation.

The inventors also discovered during the evaluation that adding the reactant component (e.g., hydrogen) through the high-flow valve 130 to stream 145 on the low pressure side (i.e., suction side) of the compressor 150 caused surging in the compressor 150. To minimize potential damage to the compressor 150, stream 125 comprising the reactant component (e.g., hydrogen) entered via stream 135 into stream 155 on the high pressure side (i.e., discharge side) of the compressor 150.

During a transition, the input stream 105 comprising the reactant component (i.e., hydrogen) was redirected around the steady-state control valve 110 via a bypass valve 115 and streams 120, 125. The bypass valve 115 achieved a much higher flow rate than the control valve 110. When the bypass valve 115 was used, stream 105 comprising the reactant component (i.e., hydrogen) entered via stream 140 into stream 145 on a low-pressure side (i.e., suction side) of a compressor 150. The compressor 150 compresses the reactant component (e.g., hydrogen) to a pressure required for the polyolefin reactor 160.

Stream 155 carried the reactant component (e.g., hydrogen) into the gas-phase polyolefin reactor 160. Stream 165 comprised a reactor recycle gas coming from the polyolefin reactor 160. Stream 165 comprising the reactor recycle gas was directed through a heat exchanger 170. The heat exchanger 170 cooled stream 165 comprising the reactor recycle gas into gas- and liquid-phase components. Cooled stream 165 carried the gas- and liquid-phase components to a separator tank 175. The separator tank 175 held the gas- and liquid-phase components from the heat exchanger 170. The liquid-phase components were pumped to the polyolefin reactor 160, and the gas-phase components were compressed by the compressor 150 and recycled to the polyolefin reactor 160. Stream 145 comprising the gas-phase components (and the reactant component (e.g., hydrogen) from stream 140) coming from the separator tank 175 entered on a low-pressure side (i.e., suction side) of a compressor 150.

The empirical model 190 received input from an online analyzer 195 (e.g., off-gas analyzer), which measured the concentration of the reactant component (e.g., hydrogen). In this example, a Yokogawa online analyzer (i.e., GC1000 MARK II™) was used for the evaluation.

At the beginning of any transition, the empirical model 190 received input from the online analyzer 195, which measured a starting concentration of the reactant component (e.g., hydrogen). The empirical model 190 predicted a required amount (lbs) of reactant component (e.g., hydrogen) necessary to complete the transition based upon the measured starting concentration of the reactant component (e.g., hydrogen) and a desired ending concentration of the reactant component (e.g., hydrogen).

The totalizer 185 received input from the flow meter 180, which measures a flow rate of the reactant component (e.g., hydrogen). Based upon the measured flow rate of the reactant component (i.e., input stream 125), the totalizer 185 determined a totalized amount when the flow rate of the input stream 125 reached the required amount (lbs) of reactant component, and output the totalized amount (lbs) to the empirical model 190. The empirical model 190 compared the required amount of reactant component to the totalized amount and determined a transition endpoint, and output the transition endpoint to the totalizer 185. By predicting the transition endpoint, the totalizer 185 was able to simultaneously shut-off the flow of reactant component (e.g., hydrogen) at the appropriate time via the high-flow valve 130 rather than requiring an operator to oversee the addition of hydrogen, which introduces associated risks of human error and inexperience.

Example of Empirical Model for a Gas-Phase Polyolefin Reactor System

Figure 2:
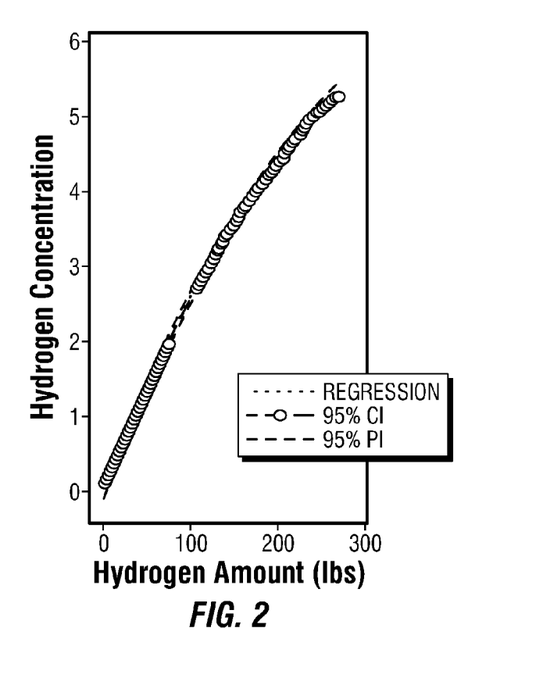
FIG. 2 illustrates a chart of hydrogen amount (lbs) vs. hydrogen concentration as an exemplary empirical model for a gas-phase polyolefin reactor system according to an embodiment of the present invention, wherein A=14.852*B/(476.544+B), where A=hydrogen concentration, and B=hydrogen amount (lbs)

An exemplary empirical model for a gas-phase polyolefin reactor system according to an embodiment of the present invention is illustrated in FIG. 2. In particular, FIG. 2 shows a chart of hydrogen amount (lbs) vs. hydrogen concentration as an empirical model to rapidly increase the hydrogen concentration within the gas-phase polyolefin reactor to decrease the molecular weight of the polyolefin (e.g. polypropylene).

Data for this empirical model 190 was collected from observed transitions between different molecular weight products in the gas-phase polyolefin reactor 160. The model utilized data measured by an online analyzer 195 of the hydrogen concentration within the reactor recycle gas system (i.e., stream 145). Also, data on the hydrogen amount (lbs) added to the polyolefin reactor 160 during these transitions was measured by the flow meter 180 and incorporated into the model.

The empirical model 190 correlates these two sets of data using a Michaelis-Menten fit and predicts the hydrogen amount (lbs) necessary to complete a transition between two different hydrogen concentrations. The fitted line plot is $$A = 14.852 * B / (476.544 + B)$$

where

A = hydrogen concentration, and

B = hydrogen amount (lbs).

The empirical model 190 can be used to determine the hydrogen amount (lbs) required for a transition of molecular weight of polypropylene powder produced within the polyolefin reactor 160 because a change in hydrogen concentration in the recycle gas system (i.e., stream 145) affects the molecular weight of the powder produced within the polyolefin reactor 160. For example, a transition from a polypropylene powder requiring a hydrogen concentration of 1 to a polypropylene powder requiring a hydrogen concentration of 3 would require a hydrogen amount of about 86 lbs to complete the transition. (See FIG. 2). The amount of hydrogen required is the difference between the starting point and the ending point.

At the beginning of any transition, the empirical model 190 receives input from the online analyzer 195, which measures a starting concentration of the reactant component (e.g., hydrogen). The empirical model 190 predicts a required amount (lbs) of reactant component (e.g., hydrogen) necessary to complete the transition based upon the measured starting concentration of the reactant component (e.g., hydrogen) and a desired ending concentration of the reactant component (e.g., hydrogen).

The totalizer 185 determines a totalized amount when the flow rate of the input stream 105 reaches the required amount of reaction component based upon the measured flow rate, and outputs the totalized amount to the empirical model 190. The empirical model 190 compares the required amount of reactant component to the totalized amount to determine a transition endpoint, and outputs the transition endpoint to the totalizer 185. By predicting the transition endpoint, the totalizer 185 is able to simultaneously shut-off the flow of reaction component (e.g., hydrogen) at the transition endpoint via the high-flow valve 130 rather than requiring an operator to oversee the addition of hydrogen, which introduces associated risks of human error and inexperience.

Although this exemplary empirical model relates to the rapid increase of hydrogen concentration within the polyolefin reactor to decrease the molecular weight of the polyolefin (e.g., polypropylene), a person of ordinary skill in the art (POSITA) could easily apply this teaching to rapidly increase the monomer (e.g., propylene) concentration (i.e., effectively decrease the hydrogen concentration) within the polyolefin reactor to increase the molecular weight of the polyolefin (e.g., polypropylene), as discussed above.

Further, the POSITA could easily extend this teaching to other gas-phase polyolefin processes and/or reactant components. For example, the empirical model could be fine-tuned to rapidly transition the co-monomer (e.g., ethylene, 1-butene, 1-hexene, 1-octene), co-catalyst (e.g., tetraethylammonium iodide (TEAI)) or catalyst modifier (e.g., di-isopropyldimethoxysilane (DIPDMS), di-isobutyldimethoxysilane (DIBDMS)) to change the physical properties of the polyolefin (e.g., polypropylene) in polyolefin production. In an embodiment, the co-monomer (e.g., ethylene, 1-butene, 1-hexene and/or 1-octene) could be rapidly increased within the polyolefin reactor to change the physical properties of the polyolefin (e.g., polypropylene) in polyolefin production. In ICP polyolefin production, the co-monomer (e.g., ethylene) could be rapidly changed to alter rubber content in the produced polyolefin product, and, thereby, achieve the specific properties for various ICP grades. In an embodiment, the catalyst modifier could be rapidly switched from DIPDMS to DIBDMS to increase the production of atactic polymer and, thereby, decrease the flexural modulus of the produced polyolefin product.

Method for Rapid Transitioning

In an embodiment, the method for rapid transitioning a gas-phase polyolefin reactor system from one polyolefin product to another comprises the steps of selecting an ending reactant component concentration; measuring a starting reactant component concentration with an online analyzer 195 to obtain a measured starting reactant component concentration; predicting a required amount of reactant component with an empirical model 190 based upon the measured starting reactant component concentration and the selected ending reactant component concentration; measuring a flow rate of an input stream 105 near an input end of a high-flow valve 130 with a flow meter 180; estimating a required time to inject the required amount of reaction component with a totalizer 185 based upon the measured flow rate of the input stream 105.

In an embodiment, the reactant component may be selected from the group consisting of hydrogen, monomers, co-monomers, co-catalysts and catalyst modifiers. In an embodiment, the reactant component may be selected from the group consisting of hydrogen, ethylene, propylene, 1-butene, 1-hexene and 1-octene. In an embodiment, the co-catalyst may be TEAI. In an embodiment, the catalyst modifier may be selected from the group consisting of DIPDMS and DIBDMS.

In an embodiment, the method further comprises the step of closing the high-flow valve simultaneously with the addition of the required amount of reactant component. In an embodiment, the high-flow valve may be automatically closed.

Example of an Operator Overshoot During a Transition of Molecular Weight

Figure 3:
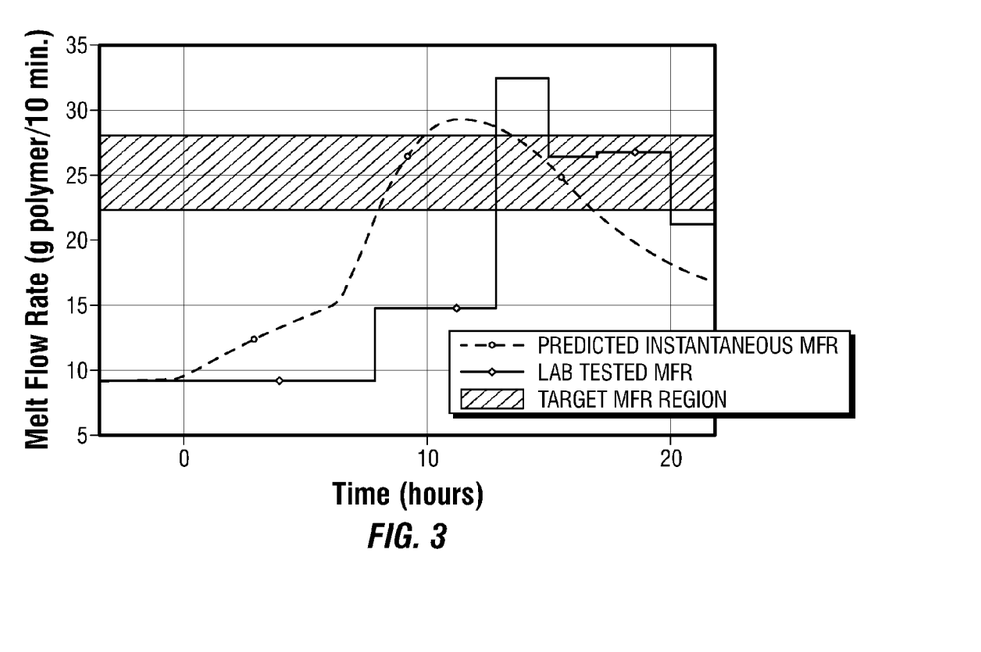
FIG. 3 illustrates an example of an operator overshoot scenario where the operator relies on an online analyzer when adding a high rate of hydrogen during a transition of molecular weight.

An example of an overshoot scenario where an operator relies on an online analyzer when adding a high rate of reactant component (i.e., hydrogen) during a transition of molecular weight is illustrated in FIG. 3. As discussed above, examples of on-line analyzers include, but are not limited to, gas chromatographs and mass spectrometers.

In particular, FIG. 3 shows an operator overshoot scenario where the operator relies on the online analyzer when adding the reactant component (i.e., hydrogen) at an increased rate during a transition of the molecular weight. In FIG. 3, the predicted instantaneous melt flow rate (MFR) and the lab-tested MFR of the polypropylene powder are shown for the transition. MFR is a measurement of the polypropylene powder viscosity and is inversely related to the molecular weight of the product (i.e., a decrease in the molecular weight is an increase in the MFR). In this example, a polypropylene powder with a target MFR of about 9 g poly/10 min. is transitioned to a polypropylene powder with a target MFR of about 25 g polymer/10 min.±2.5 g polymer/10 min.

Since the operator did not have an empirical model to predict the required amount of reactant component (i.e., hydrogen) for the transition or a totalizer to determine a required time to inject the required amount of reactant component, the operator misjudged the end point (i.e., added too much hydrogen), resulting in an overshoot of the specified range of acceptable MFR for the product. The data measured by the on-line analyzer (e.g., gas chromatograph) has an inherent time delay due to the time required for the analyzer to complete the analysis. Accordingly, the operator was required to stay off-grade by the high MFR lab result (i.e., produced off-grade material) for an additional hour until the MFR was within the specified MFR range.

In this example, the operator also overcompensated (i.e., added too little hydrogen) in reducing the MFR, which resulted in an undershot of the MFR. Again, the operator was required to stay off-grade by the low MFR lab result (i.e., produced off-grade material) until the MFR was within the specified range. As can be seen by FIG. 3, operators have difficulty predicting the required key reactant gas (i.e., hydrogen) amount due to the time delay in the data, which results in the production of off-grade material.

Although this example is fairly extreme, the risk of overshoot at high rates of reactant component (e.g., hydrogen) addition without using a predictive empirical model or a totalizer is genuine. Accordingly, unlike this example, the present invention requires the use of a predictive empirical model 190 and a totalizer 185 to control the addition of reactant component (e.g., hydrogen) at a high rate and to minimize a risk of overshooting a required amount.

Example of Traditional Molecular Weight Transition

Figure 4:
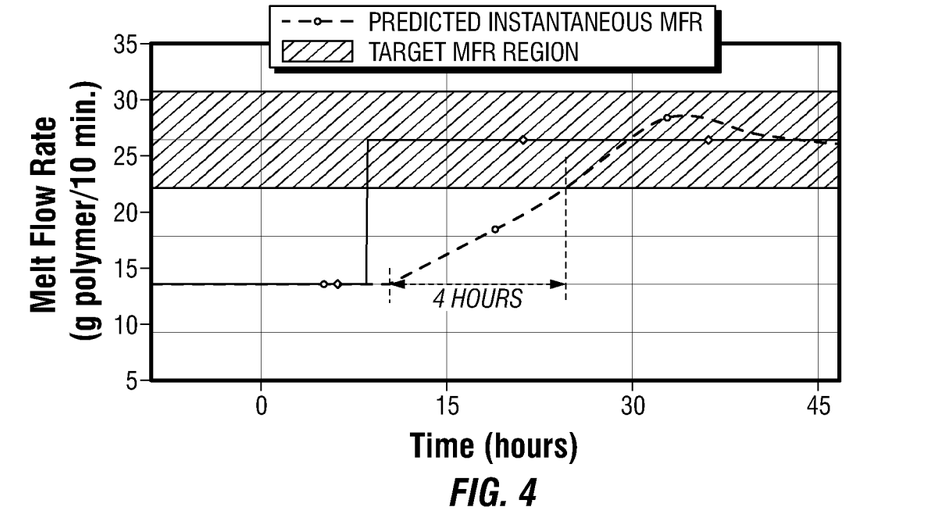
FIG. 4 illustrates an example of a transition scenario where an operator relies on melt flow rate (MFR) when adding hydrogen to a recycle gas stream during a transition of molecular weight.

A transition of molecular weight in a gas-phase polyolefin reactor 160 requires a change in hydrogen concentration in a recycle gas stream 145. An example of a transition scenario where an operator relies on an online analyzer when adding hydrogen to the recycle gas stream 145 during a transition of molecular weight is illustrated in FIG. 4. In this example, the operator was limited by the low flow rate of the steady-state control valve 110 (i.e., about 30 lbs/hour) to transition from one polyolefin product to another.

In FIG. 4, the predicted instantaneous MFR of the polypropylene powder is shown for the transition. MFR is a measurement of the polypropylene powder viscosity and is inversely related to the molecular weight of the product (i.e., a decrease in the molecular weight is an increase in the MFR), as discussed above. In this example, a polypropylene powder with a target MFR of about 10 g polymer/10 min. is transitioned to a polypropylene powder with a target MFR of about 25 g polymer/10 min.±5 g polymer/10 min.

In the traditional transition technique, an input stream 105 comprises a reactant component (i.e., hydrogen) coming from a header (not shown). (See e.g., FIG. 1B: 105). The input stream 105 comprising the reactant component (i.e., hydrogen) is directed through a steady-state control valve 110. (See e.g., FIG. 1B: 105, 110). During transition, the reactant component (i.e., hydrogen) is regulated by a control valve 110 normally used for steady-state operation. (Id.). The input stream 105 comprising the reactant component (i.e., hydrogen) enters via stream 140 into stream 145 on a low-pressure side (i.e., suction side) of a compressor 150. (See e.g., FIG. 1B: 105, 140, 145 & 150). During transition, the hydrogen control valve 110 is opened to a maximum. At the valve's maximum, the hydrogen flow rate is about 30 lbs/hour.

At a maximum flow rate of about 30 lbs/hour, the transition from the polypropylene powder with a MFR of about 10 g polymer/10 min. to the polypropylene powder with a low range MFR of about 20 g polymer/10 min. is estimated by the instantaneous MFR model to be achieved in about 4 hours, which results in the production of about 184,100 lbs of off-grade material.

This example is representative of traditional transitions from one polyolefin product to another, and the risk of overshoot at high rates of reactant component (e.g., hydrogen) addition without using a predictive empirical model or a totalizer is genuine. Accordingly, unlike this example, the present invention requires a high-flow valve 130 to permit the addition of reactant component (e.g., hydrogen) at a high rate and to minimize production of off-grade material.

Example of Rapid Hydrogen Addition for Molecular Weight Transition

Figure 5:
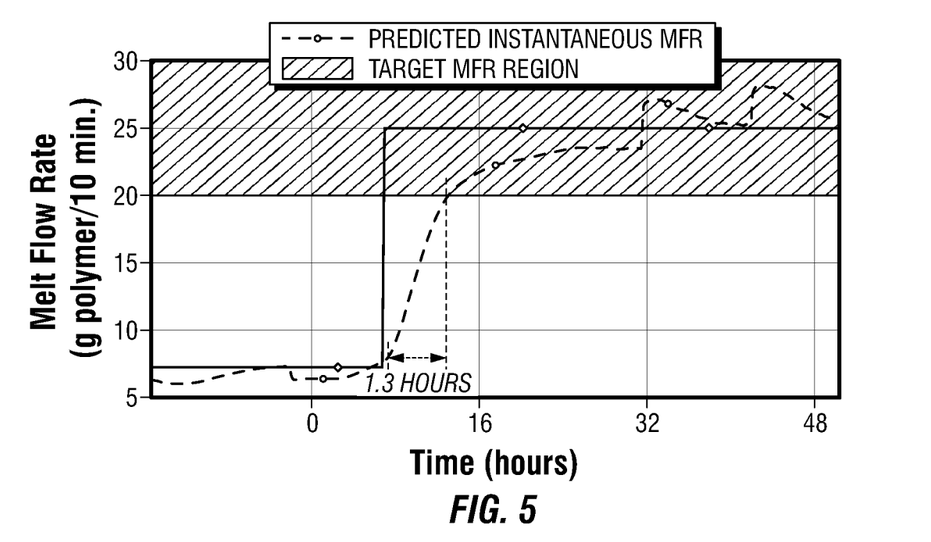
FIG. 5 illustrates an example of a transition scenario where an operator relies on an embodiment of the present invention when adding hydrogen to a recycle gas stream during a transition of molecular weight.

An example of a transition scenario where an operator relies on an embodiment of the present invention when adding hydrogen to a recycle gas stream during a transition of molecular weight is illustrated in FIG. 5. In this example, the operator was not limited by the low-flow rate of the steady-state control valve 110 (e.g., about 30 lbs/hour) to transition from one polyolefin product to another. Instead, the operator was able to bypass the steady-state control valve 110 through a bypass valve 115 and a high-flow valve 130.

In FIG. 5, the predicted instantaneous MFR of the polypropylene powder is shown for the transition. In this example, a polypropylene powder with a target MFR of about 7.5 g polymer/10 min. was transitioned to a polypropylene powder with a target MFR of about 25 g polymer/10 min.±5 g polymer/10 min. This molecular weight transition was conducted on the same equipment as the previous example—a gas-phase polyolefin reactor 160, and required the addition of hydrogen to the recycle gas stream 155.

In the experimental technique according to a prototype of the present invention, an input stream 105 comprises a reactant component (i.e., hydrogen) coming from a header (not shown). (See FIG. 1B). During transition, the input stream 105 comprising the reactant component (i.e., hydrogen) was redirected around the steady-state control valve 110 via a manual bypass valve 115. (Id.). The bypass valve 115 achieved a much higher flow rate than the control valve 110. (Id.).

The input stream 105 comprising the reactant component (i.e., hydrogen) entered via stream 140 into stream 145 on a low-pressure side (i.e., suction side) of a compressor 150. (See FIG. 1).

During this transition experiment, the hydrogen flow rate was not metered or measured; however, the hydrogen flow rate was calculated at about 500 lbs/hour. At a flow rate of about 500 lbs/hour, the transition from the polypropylene powder with a MFR of about 10 g polymer/10 min. to the polypropylene powder with a low range MFR of about 20 g polymer/10 min. is estimated by the instantaneous MFR model to be achieved in about 1.3 hours, which results in the production of about 47,500 lbs of off-grade material.

Comparison of this and the previous example shows that the rapid addition of hydrogen completes the molecular weight transition significantly faster than the traditional technique (i.e., about 1.3 hours compared to about 4 hours). Further, the faster transition significantly reduced the production of off-grade material as a result of the transition (i.e., about 47,500 lbs compared to about 184,100 lbs). As demonstrated by these examples, the present invention minimizes the transition period and significantly reduces the production of off-grade material during transitions.

Further, the present invention expands on these experimental results and applies process controls with the empirical model 190, totalizer 185, and online analyzer 195. This system and method provides a low-risk technique of achieving a quick, cost-effective transition.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

DEFINITIONS

As used herein, the terms "a," "an," "the," and "said" when used in conjunction with the term "comprising" means one or more, unless the context dictates otherwise.

As used herein, the term "about" means the stated value plus or minus a margin of error or plus or minus 10% if no method of measurement is indicated.

As used herein, the term "or" means "and/or" unless explicitly indicated to refer to alternatives only or if the alternatives are mutually exclusive.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise," provided above.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the phrase "consisting of" is a closed transition term used to transition from a subject recited before the term to one or more material elements recited after the term, where the material element or elements listed after the transition term are the only material elements that make up the subject.

As used herein, the phrase "consisting essentially of" occupies a middle ground, allowing the addition of non-material elements that do not substantially change the nature of the invention, such as various buffers, differing salts, extra wash or precipitation steps, pH modifiers, and the like.

As used herein, the term "simultaneously" means occurring at the same time or about the same time, including concurrently.

INCORPORATION BY REFERENCE

All patents and patent applications, articles, reports, and other documents cited herein are fully incorporated by reference to the extent they are not inconsistent with this invention.

What is claimed is:

1. A method of transitioning a gas-phase polyolefin reactor system, comprising the steps of:
    a) providing a gas-phase polyolefin reactor system comprising:
        i) a control valve, wherein a first stream is connected to an input end of the control valve and to an input end of a high-flow valve and a second stream is connected to an output end of the control valve and the high-flow valve, wherein the second stream is connected to a third stream, wherein the third stream is connected to an input of the gas-phase polyolefin reactor;
    b) selecting an ending reactant component concentration;
    c) obtaining a starting reactant concentration;
    d) predicting a required amount of reactant component with an empirical model based upon the starting reactant component concentration and the selected ending reactant component concentration;
    e) measuring a flow rate of the first stream near the input end of the high-flow valve to obtain a measured flow rate of the first stream; and
    f) estimating a transition endpoint using the empirical model and a totalizer based upon the required amount of reactant component and the measured flow rate of the first stream.

2. The method of claim 1, wherein the reactant component is selected from the group consisting of hydrogen, monomers, co-monomers, co-catalysts and catalyst modifiers.

3. The method of claim 2, wherein the reactant component is selected from the group consisting of hydrogen, ethylene, propylene, 1-butene, 1-hexene and 1-octene.

4. The method of claim 3, wherein the reactant component is hydrogen.

5. The method of claim 3, wherein the reactant component is ethylene.

6. The method of claim 3, wherein the reactant component is propylene.

7. The method of claim 3, wherein the reactant component is 1-butene, 1-hexene or 1-octane.

8. The method of claim 3, wherein the reactant component is selected from the group consisting of co-catalysts and catalyst modifiers.

9. The method of claim 8, wherein the co-catalyst is TEAl.

10. The method of claim 8, wherein the catalyst modifier is selected from the group consisting of DIPDMS and DIBDMS.

11. The method of claim 1, wherein the flow rate through the high-flow valve is from about 100 lbs/hour to about 2,500 lbs/hour.

12. The method of claim 1, further comprising the step of closing the high-flow valve at about the transition endpoint.

13. The method of claim 12, wherein the high-flow valve is automatically closed.

14. The method of claim 8, wherein the catalyst modifier is selected from the group consisting of DIPDMS, DIBDMS and other organosilanes.

15. The method of claim 8, wherein the catalyst modifier is selected from the group consisting of DIPDMS, DIBDMS and other dimethoxysilanes.

16. The method of claim 1, wherein the starting reactant component concentration is measured.

17. The method of claim 1, wherein the starting reactant component concentration is measured with an online analyzer.

18. The method of claim 1, wherein the flow rate of the first stream is measured with a flow meter.

* * * * *